(12) United States Patent
Yang et al.

(10) Patent No.: US 10,866,590 B2
(45) Date of Patent: Dec. 15, 2020

(54) COMPUTER-ASSISTED OR AUTONOMOUS DRIVING SAFETY-RELATED DECISION MAKING SYSTEM AND APPARATUS

(71) Applicant: Intel Corporation, Santa Clara, CA (US)

(72) Inventors: Xue Yang, San Jose, CA (US); Sherry Chang, El Dorado Hills, CA (US); Chaitanya Sreerama, Hillsboro, OR (US); Linda L. Hurd, Cool, CA (US); Denica Larsen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 16/146,987

(22) Filed: Sep. 28, 2018

(65) Prior Publication Data

US 2019/0049982 A1    Feb. 14, 2019

(51) Int. Cl.
| | | |
|---|---|---|
| *G05D 1/02* | (2020.01) | |
| *G05D 1/00* | (2006.01) | |
| *B60W 30/00* | (2006.01) | |
| *G06N 20/00* | (2019.01) | |
| *G06Q 40/08* | (2012.01) | |
| *G06N 3/08* | (2006.01) | |
| *G06Q 50/30* | (2012.01) | |
| *G07C 5/00* | (2006.01) | |
| *G06N 3/04* | (2006.01) | |

(52) U.S. Cl.
CPC ........... *G05D 1/0221* (2013.01); *B60W 30/00* (2013.01); *G05D 1/0088* (2013.01); *G05D 1/024* (2013.01); *G05D 1/0246* (2013.01); *G05D 1/0255* (2013.01); *G05D 1/0257* (2013.01); *G05D 1/0278* (2013.01); *G06N 3/08* (2013.01); *G06N 20/00* (2019.01); *G06Q 40/08* (2013.01); *G06Q 50/30* (2013.01); *G05D 2201/0213* (2013.01); *G06N 3/0454* (2013.01); *G07C 5/008* (2013.01)

(58) Field of Classification Search
None
See application file for complete search history.

(56) References Cited

PUBLICATIONS

Study on Driving Decision Making (Year: 2017).*
Decision Making for Autonomous Driving (Year: 2017).*
Tesla Safety Report (Year: 2019).*

\* cited by examiner

*Primary Examiner* — Abdhesh K Jha
(74) *Attorney, Agent, or Firm* — Schwabe, Williamson & Wyatt, P.C.

(57) ABSTRACT

Apparatuses, methods, and systems associated with safety-related decision making reporting and regulation of computer-assisted or autonomous driving (CA/AD) vehicles are disclosed herein. In some embodiments, an apparatus includes a safety-related decision making reporting unit, disposed in a CA/AD vehicle, to collect data about driving behavior of the CA/AD vehicle and to determine whether the collected data is related to a safety-related decision making rule. In embodiments, the collected data is to be reported to a remote organization associated with regulating the safety-related decision making rule. In some embodiments, a computing device or server associated with regulating safety-related decision making rules receives the collected data from the CA/AD vehicle and/or manufacturers of the CA/AD vehicle. In embodiments, the computing device analyzes the collected data to modify or generate a safety-decision making rule. Other embodiments are also described and claimed.

24 Claims, 8 Drawing Sheets

COMPUTER-ASSISTED OR AUTONOMOUS DRIVING SAFETY-RELATED DECISION MAKING SYSTEM AND APPARATUS

TECHNICAL FIELD

The present disclosure relates to the field of computer-assisted or autonomous driving (CA/AD). More particularly, the present disclosure relates to systems and apparatuses for safety-related decision making as applied to autonomous vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Safety is a major incentive for adoption of autonomous driving. Appropriate methods to validate and accredit safety, however, do not yet exist. Current regulations pose significant challenges when applied to automation. New regulations are called for, yet little understanding exists on how to properly regulate autonomous driving. In addition, ethical considerations related to autonomous driving have captured public attention.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings ("FIGS.").

DETAILED DESCRIPTION

Figure 1:
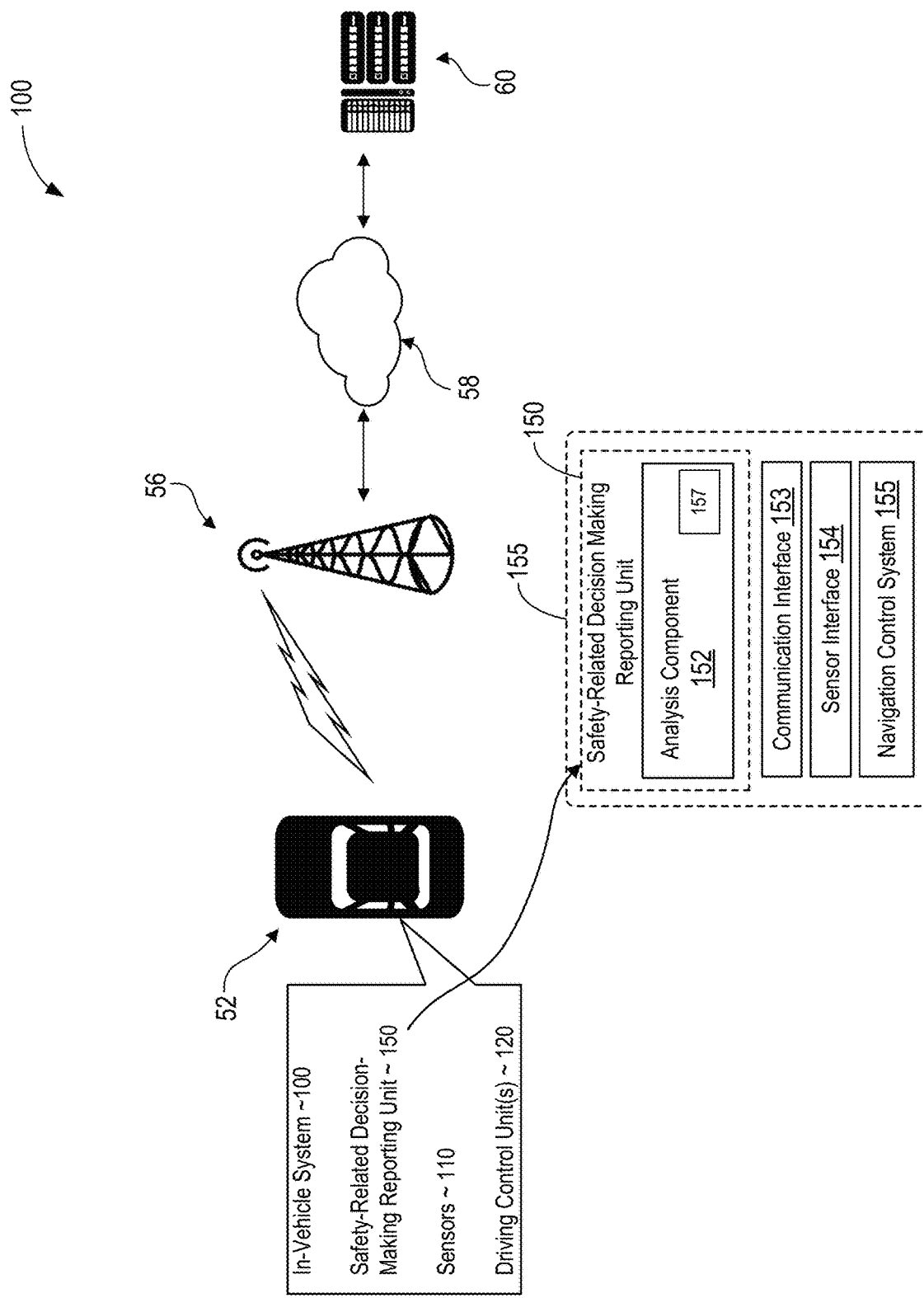
FIG. 1 illustrates an environment and components of a computer-assisted or autonomous driving (CA/AD) system for incorporating and using the safety-related decision making reporting and regulation ("safety-related reporting and regulation") technology of the present disclosure, in accordance with various embodiments.

Apparatuses, methods, and storage media associated with a computer-assisted or autonomous driving safety-related decision making reporting and regulation system ("safety-related reporting and regulation system") are disclosed herein. In some embodiments, a safety-related decision making reporting unit ("reporting unit"), disposed in a computer-assisted or autonomous driving (CA/AD) vehicle, collects data about driving behavior of the CA/AD vehicle and determines whether the collected data is related to a safety-related decision making rule (also referred to as "safety decision making rule"). The reporting unit, in embodiments, determines whether the collected data is to be reported to a remote organization associated with regulating the safety decision making. In embodiments, the remote organization receives data including driving information related to safety-related decision making behavior of CA/AD vehicles. In some embodiments, the remote organization analyzes the received data to generate or modify one or more safety-related decision making rules for the respective CA/AD vehicles and provides the modified or generated one or more safety-related decision making rules to respective manufacturers of the respective CA/AD vehicles.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in some embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates an environment and components of a computer-assisted or autonomous driving (CA/AD) system for incorporating and using the safety-related decision making reporting and regulation technology of the present disclosure, in accordance with various embodiments. As shown, for the illustrated embodiments, the example environment includes vehicle 52 having an engine, transmission, axles, wheels and so forth. In embodiments, vehicle 52 is a computer-assisted or autonomous driving (CA/AD) vehicle. Further, vehicle 52 includes in-vehicle system 100 having a number of infotainment subsystems/applications, e.g., instrument cluster subsystems/applications, front-seat infotainment subsystems/applications, such as a navigation subsystem/application, a media subsystem/application, a vehicle status subsystem/application and so forth, and a number of rear-seat entertainment subsystems/applications. Further, in-vehicle system 100 is provided with or coupled to a CA/AD system 155 including a safety-related decision making reporting unit ("reporting unit") 150 of the present disclosure, to collect and report driving behavior of vehicle 52 to assist in reporting and regulation of one or more safety decision making rules. Examples of safety decision making rules include rules related to prioritization of safety of the CA/AD driver and/or passengers versus pedestrians, bikers, and the like, and/or other drivers and/or passengers of other vehicles. Examples may include but are not limited to avoidance by the CA/AD vehicle of an accident or vehicles that may be out of control, and rules governing braking for pedestrians, approaches to stop signs, construction, or accident scenes, and so forth.

Still referring to FIG. 1, vehicle 52 includes sensors 110 and driving control unit(s) 120. In some embodiments, sensors 110 are configured to provide various sensor data to reporting unit 150. In some embodiments, sensors 110 may include cameras such as, e.g., vision-based cameras (outward facing as well as inward facing), radar, light detection and ranging (LiDAR) sensors, microphones, accelerometers, gyroscopes, inertia measurement units (IMU), engine sensors, drive train sensors, tire pressure sensors, and so forth. Driving control unit 120 may include electronic control units (ECUs) that control the operation of the engine, transmission, steering, and/or braking of vehicle 52.

Accordingly, in embodiments, reporting unit 150 is disposed in a CA/AD vehicle, e.g., vehicle 52, to collect data about driving behavior of the CA/AD vehicle and to determine whether the collected data is related to a safety-related decision making rule. Reporting unit 150, in embodiments, determines whether the collected data is to be reported to a remote organization associated with regulating the safety decision making rule. In embodiments, reporting unit 150 includes an analysis component 152. In some embodiments, reporting unit 150 is also coupled to a communication interface 153, sensor interface 154, and a navigation control system 155. In embodiments, sensor interface 154 is coupled to reporting unit 150 to receive sensor data from sensors 110 related to the driving behavior of the CA/AD vehicle, and provide the sensor data to reporting unit 150. In embodiments, communication interface 153 is coupled to reporting unit 150 to communicate the collected data to the remote organization, in response to a determination that the collected data is to be reported to the remote organization associated with regulating the safety-related decision making rule. Note that in some embodiments, analysis component 152 also includes a smart regulator (further discussed below in connection with FIG. 3).

In embodiments, reporting unit 150 determines whether the collected data is related to a safety-related decision making rule and determines whether the collected data relates to an accident or a near accident involving pedestrians and/or other vehicles proximate to the CA/AD vehicle. In some embodiments, communication interface 153 receives criteria from the remote organization and provides the received criteria to reporting unit 150, wherein the criteria determines whether the collected data is required to be reported. Accordingly, in embodiments, analysis component 152 determines whether the collected data about the driving behavior of the CA/AD vehicle meets the criteria. As noted above, in embodiments, reporting unit 150 further includes or is coupled to a navigation control system 155. In embodiments, navigation control system 155 includes a global positioning system (GPS) coupled to provide data about driving behavior of the CA/AD vehicle to reporting unit 150.

In some embodiments, in-vehicle system 100, on its own or in response to the user interactions, may communicate or interact with one or more off-vehicle remote servers 60, via a wireless signal repeater or base station on transmission tower 56 near vehicle 52, and one or more private and/or public wired and/or wireless networks 58. Servers 60 may be servers associated with a manufacturer of the CA/AD vehicle (e.g., vehicle 52), a remote organization associated with regulating safety-related decision making rules for CA/AD vehicles, the insurance companies providing insurance for vehicle 52, servers associated with law enforcement, or third party servers who provide vehicle incident related services, such as forwarding reports/information to insurance companies, repair shops, and so forth, for storage and subsequent review by law enforcement, insurance adjusters and so forth. Examples of private and/or public wired and/or wireless networks 58 may include the Internet, the network of a cellular service provider, and so forth. It is to be understood that transmission tower 56 may be different towers at different times/locations, as vehicle 52 is en route to its destination.

These and other aspects of reporting unit 150 will be further described with references to the remaining FIGS. For the purpose of this specification, one or more vehicles 52 may be referred to as a CA/AD vehicle(s).

Figure 2:
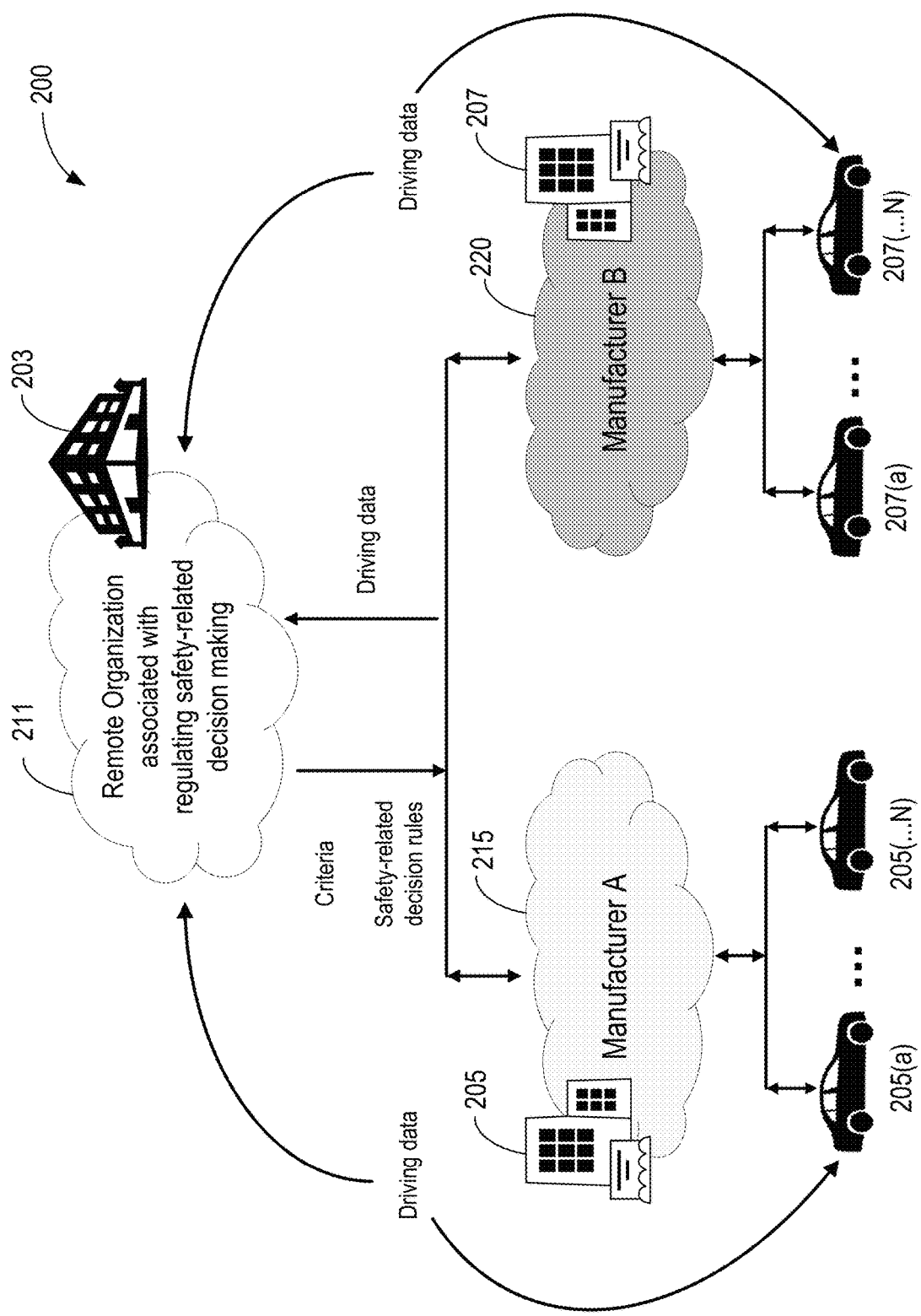
FIG. 2 illustrates an environment for incorporating and using the safety-related reporting and regulation technology of the present disclosure, in accordance with various embodiments.

Referring now to FIG. 2, which illustrates an environment for incorporating and using the safety-related decision making reporting and regulation technology of the present disclosure, according to various embodiments. As shown, environment 200 includes a remote organization 203 communicatively coupled via, e.g., one or more networks 211 (e.g., element 58 of FIG. 1), to manufacturers of CA/AD vehicles, e.g., manufacturer A and manufacturer B, at respective elements 205 and 207. In embodiments, remote organization 203 is associated with regulating one or more safety decision making rules. In embodiments, manufacturer A is the manufacturer of CA/AD vehicles 205(a) and 205( . . . N) and manufacturer B is the manufacturer of CA/AD vehicles 207(a) and 207( . . . N) ("respective CA/AD vehicles"). Accordingly, manufacturer A and manufacturer B are communicatively coupled to their respective CA/AD vehicles via respective networks 215 and 220. As shown, in embodiments, in addition to being communicatively coupled to the respective manufacturers, remote organization 203 is also communicatively coupled via one or more networks 211 to the respective CA/AD vehicles. In embodiments, remote organization 203 is associated with regulating safety-related decision making rules for the respective CA/AD vehicles. In some embodiments, respective networks 215 and 220 may overlap, e.g., both including a public network, such as the Internet.

In embodiments, remote organization 203 receives driving data from manufacturer A and manufacturer B. Remote organization 203, in embodiments, also receives driving data ("data") from CA/AD vehicles 205(a)-205( . . . N) and CA/AD vehicles 207(a)-207( . . . N). In embodiments, remote organization 203 analyzes the received data to generate and/or modify one or more safety-related decision making rules to be implemented by the respective manufacturers in the respective CA/AD vehicles. In various embodiments, the decision making rules may be required by law to be implemented in the respective CA/AD vehicles.

Note that for purposes of clarity in FIG. 2, only two manufacturers are shown; however, embodiments include any number of CA/AD vehicle manufacturers that manufacture CA/AD vehicles. Furthermore, although only one remote organization is shown, it is to be understood that the remote organization may be one of a plurality of organizations that individually or collaboratively regulate and enforce safety-decision making rules as applied to CA/AD vehicles. Still further, while separate networks 215 and 220 are shown for manufacturers A and B, in some embodiments, respective networks 215 and 220 may overlap, e.g., both including a public network, such as the Internet.

Figure 3:
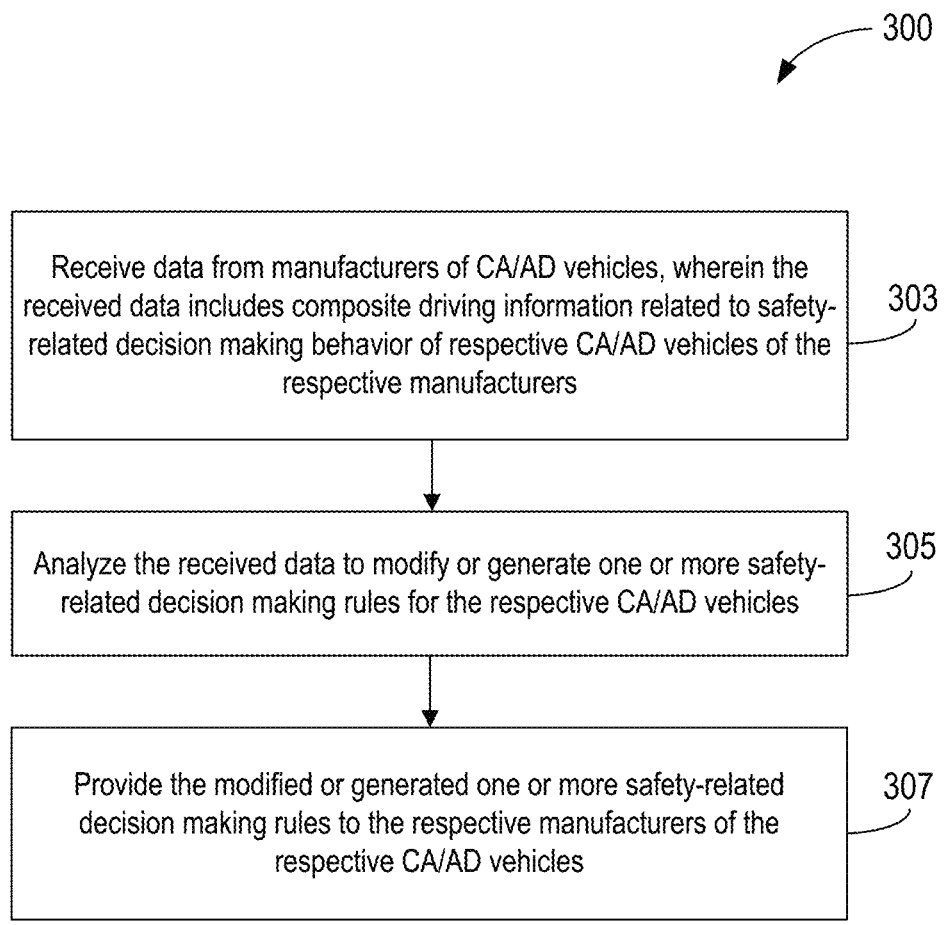
FIGS. 3-5 are flow diagrams illustrating example safety-related reporting and regulation processes, according to various embodiments.
Figure 4:
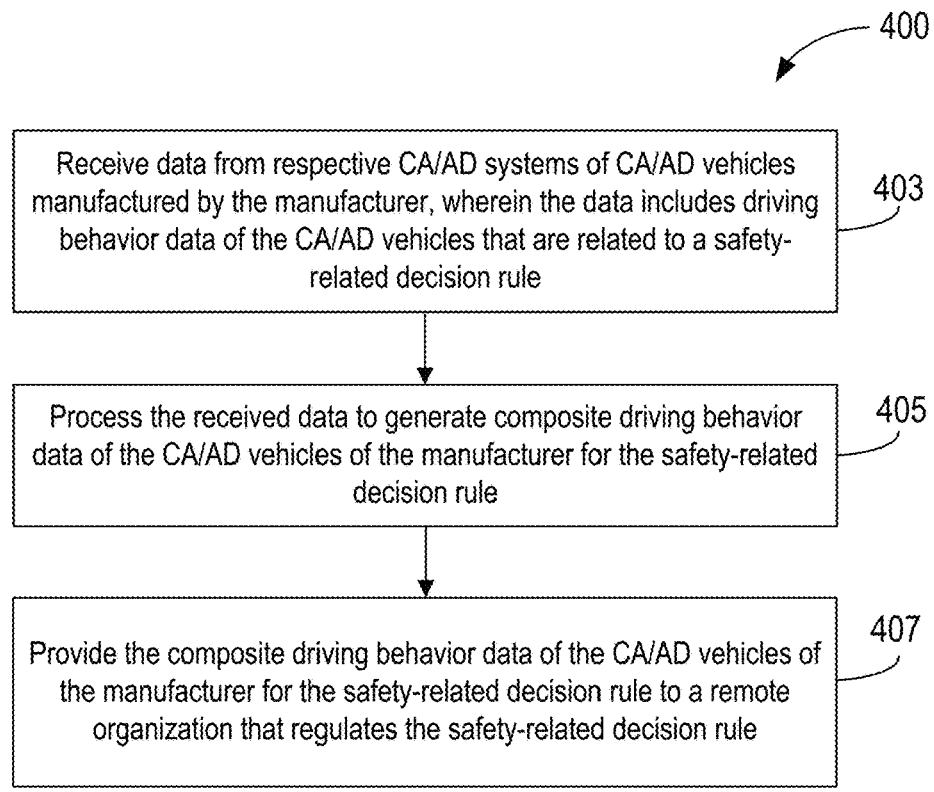
Figure 5:
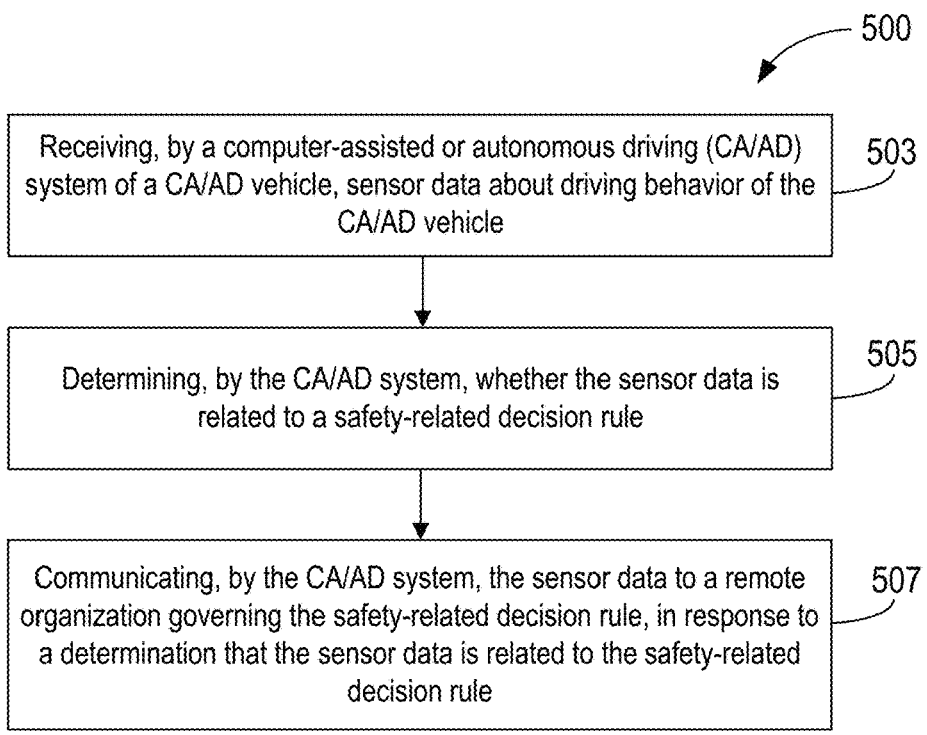

FIGS. 3-5 are flow diagrams of processes 300, 400, and 500 to further illustrate embodiments related to FIG. 2. For example, in FIG. 3, one or more computing devices or servers associated with remote organization 203 performs a process 300. As noted above, in embodiments, remote organization 203 is associated with regulating one or more safety decision making rules for CA/AD vehicles. In embodiments, beginning at block 303, a regulation subsystem of the server or computing device receives data from manufacturers of CA/AD vehicles. The received data, in embodiments, includes composite driving information related to safety-related decision making behavior of respective CA/AD vehicles of the respective manufacturers. In embodiments, the composite data driving information includes data received by the respective manufacturers from CA/AD systems of the respective CA/AD vehicles manufactured by the manufacturer.

In embodiments, the regulation subsystem also receives driving information directly from the respective CA/AD vehicles. The regulation subsystem, in embodiments, provides the respective manufacturers of CA/AD vehicles and CA/AD vehicles with criteria for deciding what type of driving behavior data is related to the safety-related decision making behavior and thus should be provided to the remote organization.

Accordingly, at a next block 305, the regulation subsystem analyzes the received data to modify or generate one or more safety-related decision making rules for the respective CA/AD vehicles. In some embodiments, the regulation subsystem analyzes the received data to determine whether the outcome of the accident or near accident is related to a safety-related decision rule implemented in one or more of the CA/AD vehicles. Accordingly, in some embodiments, the regulation subsystem determines how a safety-related decision rule prioritizes a driver or a passenger of a CA/AD vehicle over other road users including, e.g., bikers, pedestrians, or other drivers and/or passengers of other vehicles. Thus, the regulation subsystem may analyze a scenario to determine whether a cause of an accident is related to a technology failure or a safety-related decision rule. For example, in some embodiments, if received data is related to a CA/AD vehicle and pedestrian accident, the regulation subsystem determines whether a sensor of the CA/AD vehicle failed to capture a pedestrian or failed to recognize the pedestrian as a person. In some embodiments, the regulation subsystem determines if a safety-related decision rule discriminates against road users based on, e.g., gender, age, or health/disability.

Accordingly, in embodiments, the regulation subsystem analyzes the received data to determine a cause of an accident or a near accident involving one or more of the respective CA/AD vehicles and bases the modification or generation of the additional one or more safety-related decision rules on ethical rules related to an outcome of the accident or the near accident. In various embodiments, machine learning and data mining is applied to the received data. In embodiments, the regulation subsystem of the server accesses a database including information related to scenarios associated with similar accidents or near accidents to assist in the modification or generation of the additional one or more safety-related decision rules.

Next, at final block 307, the regulation subsystem provides the modified or generated one or more safety-related decision making rules to the respective manufacturers of the respective CA/AD vehicles. In embodiments, the modified or generated one or more safety-related decision making rules is to be implemented by the respective manufacturers in the respective CA/AD vehicles. In embodiments, the safety-related decision making rules to be implemented in the respective CA/AD vehicles are required by law to be implemented in the respective CA/AD vehicles.

In some embodiments, enforcement of collection of safety-related CA/AD vehicle data as well as enforcement of safety-related decision and associated regulation rules is implemented through a "smart regulator" or, e.g., a "smart regulation contract." For example, in some embodiments, a smart regulator (e.g., smart regulation contract component 157 of FIG. 1) embeds data collection rules and/or safety-related decision rules in hardware and software of a CA/AD vehicle. Accordingly, in embodiments, a server or the regulation subsystem of the server provides information related to a smart regulation contract to the respective manufacturers. In some embodiments, the smart regulator observes and verifies compliance or violation of rules by CA/AD vehicles and/or individual manufacturers. The smart regulator, in some embodiments, can help scale the reporting and regulation system to millions of cars, and remove the system's dependence on vague legal codes.

Accordingly, FIG. 4 illustrates a process 400 performed by a computing device, e.g., a reporting server associated with a manufacturer (e.g., manufacturer A and/or manufacturer B of FIG. 2) of computer-assisted or autonomous driving (CA/AD) vehicles. In embodiments, at block 403, the reporting server receives data from respective CA/AD systems of CA/AD vehicles manufactured by the manufacturer. In embodiments, the data includes driving behavior data of the CA/AD vehicles that are related to a safety-related decision rule. In some examples, the reporting server receives from a remote organization (e.g., the remote organization performing process 300 of FIG. 3) criteria for deciding what type of driving behavior data is related to the safety-related decision rule for the CA/AD vehicles. In embodiments, in response to the receipt of the criteria, the reporting server provides the criteria to the CA/AD systems of the CA/AD vehicles of the manufacturer. Note that in embodiments, the reporting server also receives from the remote organization the safety-related decision rule to be implemented by CA/AD vehicles.

At a next block 405, the reporting server processes the received data to generate composite driving behavior data of the CA/AD vehicles of the manufacturer for the safety-related decision rule. At block 407, in the embodiments, the reporting server then provides the composite driving behavior data of the CA/AD vehicles of the manufacturer for the safety-related decision rule to the remote organization that regulates the safety-related decision rule. Note that in some embodiments, the reporting server is a third party reporting server that services a plurality of manufacturers of CA/AD vehicles (e.g., in some embodiments, the third party reporting server may service both example manufacturers A and B).

Now referring to FIG. 5, which illustrates a process 500 performed by a CA/AD system of a CA/AD vehicle (e.g., CA/AD vehicles 205(a)-205( . . . N) and 207(a)-207( . . . N) of FIG. 2) according to various embodiments. In embodiments, at block 503, the CA/AD system receives sensor data about driving behavior of the CA/AD vehicle that includes the CA/AD system (e.g., via sensor interface 154 of FIG. 1). Next, at block 505, in embodiments, the CA/AD system determines whether the sensor data is related to a safety-related decision rule. Accordingly, in some embodiments, to determine that the sensor data is related to the safety-related decision rule includes determining whether the sensor data is related to an accident or near accident involving the CA/AD vehicle, a pedestrian, and/or another CA/AD vehicle.

In some embodiments, determining whether the sensor data is related to a safety-related decision rule includes determining whether the information included in the sensor data meets criteria set by a remote organization (e.g., remote organization 203 of FIG. 2 that performs, e.g., process 300 of FIG. 3). At a final block 507, in embodiments, the CA/AD system communicates the sensor data to the remote organization governing the safety-related decision rule, in response to a determination that the sensor data is related to the safety-related decision rule. Note that in some embodiments, communicating the sensor data to the remote organization governing the safety-related decision rule includes communicating, by the CA/AD vehicle, the sensor data directly to the remote organization according to an indication that an owner of the CA/AD vehicle gives permission for the sensor data to be communicated to the remote organization.

Figure 6:
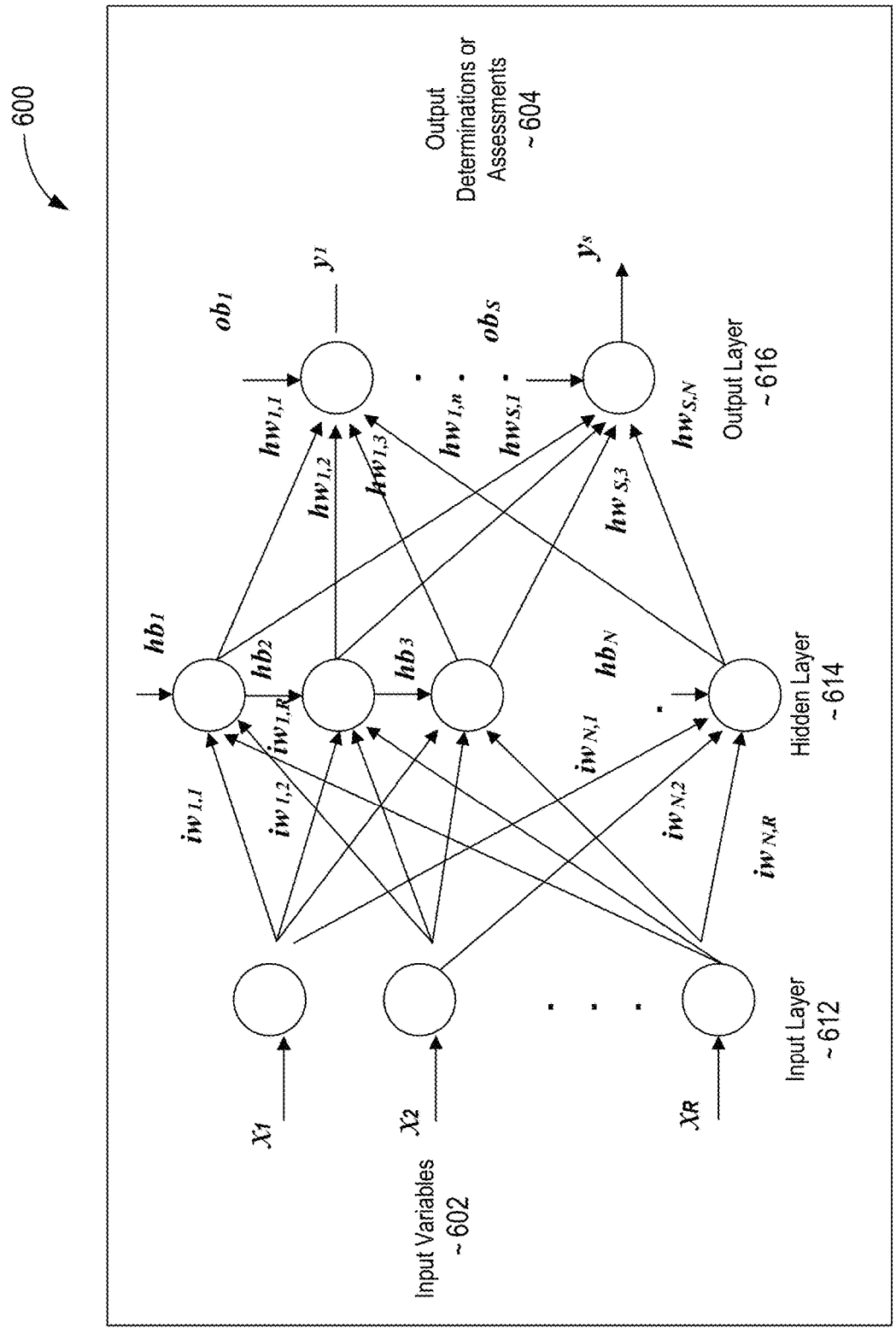
FIG. 6 illustrates an example neural network suitable for use with the present disclosure, according to various embodiments.

In some embodiments, an example safety-related decision making reporting unit (e.g., analysis component 152 of reporting unit 150), and one or more processing units of a remote server associated with regulating safety-related decision making rules (e.g., as associated with the regulating subsystem and process 300 of FIG. 3), and one or more processing units of a reporting server (e.g., associated with process 400 of FIG. 4) may include one or more trained neural networks in performing its determinations and/or assessments. FIG. 6 illustrates an example neural network, in accordance with various embodiments. As shown, example neural network 600 may be a multilayer feedforward neural network (FNN) comprising an input layer 612, one or more hidden layers 614 and an output layer 616. Input layer 612 receives data of input variables (x) 602. Hidden layer(s) 614 processes the inputs, and eventually, output layer 616 outputs the determinations or assessments (y) 604. In one example implementation, the input variables (x) 602 of the neural network are set as a vector containing the relevant variable data, while the output determinations or assessments (y) 604 of the neural network are also set as a vector.

Multilayer feedforward neural network (FNN) may be expressed through the following equations:

$$ho_i = f\left(\sum_{j=1}^{R}(iw_{i,j}x_j) + hb_i\right), ho_i = f\left(\sum_{j=1}^{R}(iw_{i,j}x_j) + hb_i\right), \text{ for } i=1,\ldots,N$$

$$y_i = f\left(\sum_{k=1}^{N}(hw_{i,k}ho_k) + ob_i\right), y_i = f\left(\sum_{k=1}^{N}(hw_{i,k}ho_k) + ob_i\right), \text{ for } i=1,\ldots,S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \sum_{k=1}^{m}(E_k), \sum_{k=1}^{m}(E_k), \text{ where } E_k = \sum_{p=1}^{S}(t_{kp} - y_{kp})^2$$

$$E_k = \sum_{p=1}^{S}(t_{kp} - y_{kp})^2$$

where ykp and tkp are the predicted and the target values of pth output unit for sample k, respectively, and m is the number of samples.

In some embodiments, reporting unit 150 (including, e.g., analysis component 152 of FIG. 1) and/or a processing unit of the reporting server (associated with, e.g., manufacturers of CA/AD vehicles) described in connection with FIG. 4 may include a pre-trained neural network 600 to, e.g., determine whether collected data is related to a safety-related decision making rule, whether the collected data is to be reported to a remote organization associated with regulating the safety decision making rule, and/or process the received data to generate composite driving behavior data. Accordingly, in embodiments, pre-trained neural network 600 assists in determining whether the collected data relates to an accident or a near accident involving pedestrians or other vehicles proximate to a CA/AD and in embodiments, whether the collected data about the driving behavior of the CA/AD vehicle meets a criteria for driving behavior to be reported.

The input variables (xi) 602 may include input from the images of the outward facing cameras, and the readings of the various vehicles sensors, such as a camera, radar, light detection and ranging (LIDAR), accelerometers, gyroscopes, IMU, and so forth. The output variables (yi) 604 may include values indicating true or false for the vehicle being involved in a vehicle and/or pedestrian accident or near accident or meeting other related criteria for reporting. The network variables of the hidden layer(s) for the neural network of, e.g., reporting unit 150 for determining whether collected data is related to a safety-related decision making rule and/or whether the collected data is to be reported to a remote organization associated with regulating the safety decision making rule are determined by the training data.

Furthermore, in some embodiments, a processing unit of a remote server associated with regulating safety-related decision making rules (e.g., associated with remote organization 203 and/or as described in connection with process 300 of FIG. 3) may include a pre-trained neural network 600 to analyze the received data from manufacturers of CA/AD vehicles and/or received or collected from CA/AD vehicles themselves to modify or generate one or more safety-related decision making rules for the respective CA/AD vehicles. In embodiments, pre-trained neural network 600 also assists in analyzing the received data to determine a cause of an accident or near accident involving pedestrians or other vehicles proximate to a CA/AD.

The input variables (xi) 602 may include input from the images of the outward facing cameras, and the readings of the various vehicles' sensors, such as a camera, radar, light detection and ranging (LIDAR), accelerometers, gyroscopes, IMU, deceleration data, impact data, engine data, drive train data and so forth. The input variables (xi) 602 also include factors relating to an outcome of the accident or the near accident as determined by ethical and social considerations. In embodiments, the output variables (yi) 604 include values indicating true or false for the vehicle not involved in a vehicle and/or pedestrian accident or near accident, the vehicle following or not following required safety decision rules, or meeting other related criteria for reporting. The output variables (yi) 604 may also include related variables such as values indicating selection for various actions related to safety decision rules, e.g., a recommendation or need to generate or modify safety decision rules. The network variables of the hidden layer(s) for the neural network of the remote server associated with regulating safety-related decision making rules for determining to modify or generate one or more safety-related decision making rules or a cause of an accident or near accident are determined by the training data.

In the example of FIG. 6, for simplicity of illustration, there is only one hidden layer in the neural network. In some other embodiments, there can be many hidden layers. Furthermore, the neural network can be in some other types of topology, such as Convolution Neural Network (CNN), Recurrent Neural Network (RNN), and so forth.

In some embodiments, an example safety-related decision making reporting unit (e.g., reporting unit 150 including analysis component 152), one or more processing units and associated components of the remote server associated with regulating safety-related decision making rules (e.g., as described in connection with process 300 of FIG. 3) and one or more processing units and associated components of a reporting server (e.g., reporting server associated with a manufacturer as described in connection with process 400 of FIG. 4) may be implemented in hardware, software or a combination thereof. Example hardware implementations may include but are not limited to application specific integrated circuit (ASIC) or programmable circuits (such as Field Programmable Gate Arrays (FPGA)) programmed with the operational logic. Software implementations may include implementations in instructions of instruction set architectures (ISA) supported by the target processors, or any one of a number of high level programming languages that can be compiled into instruction of the ISA of the target processors. In some embodiments, especially those embodiments where safety-related decision making reporting unit (e.g., reporting unit 150 including analysis component 152), one or more processing units and associated components of a remote server associated with regulating safety-related decision making rules (e.g., as associated with process 300 of FIG. 3) and a reporting server associated with a manufacturer (e.g., associated with process 400 of FIG. 4) include at least one neural network, at least a portion of the aforementioned may be implemented in an accelerator. One example software architecture and an example hardware computing platform will be further described later with references to FIGS. 7 and 8.

Figure 7:
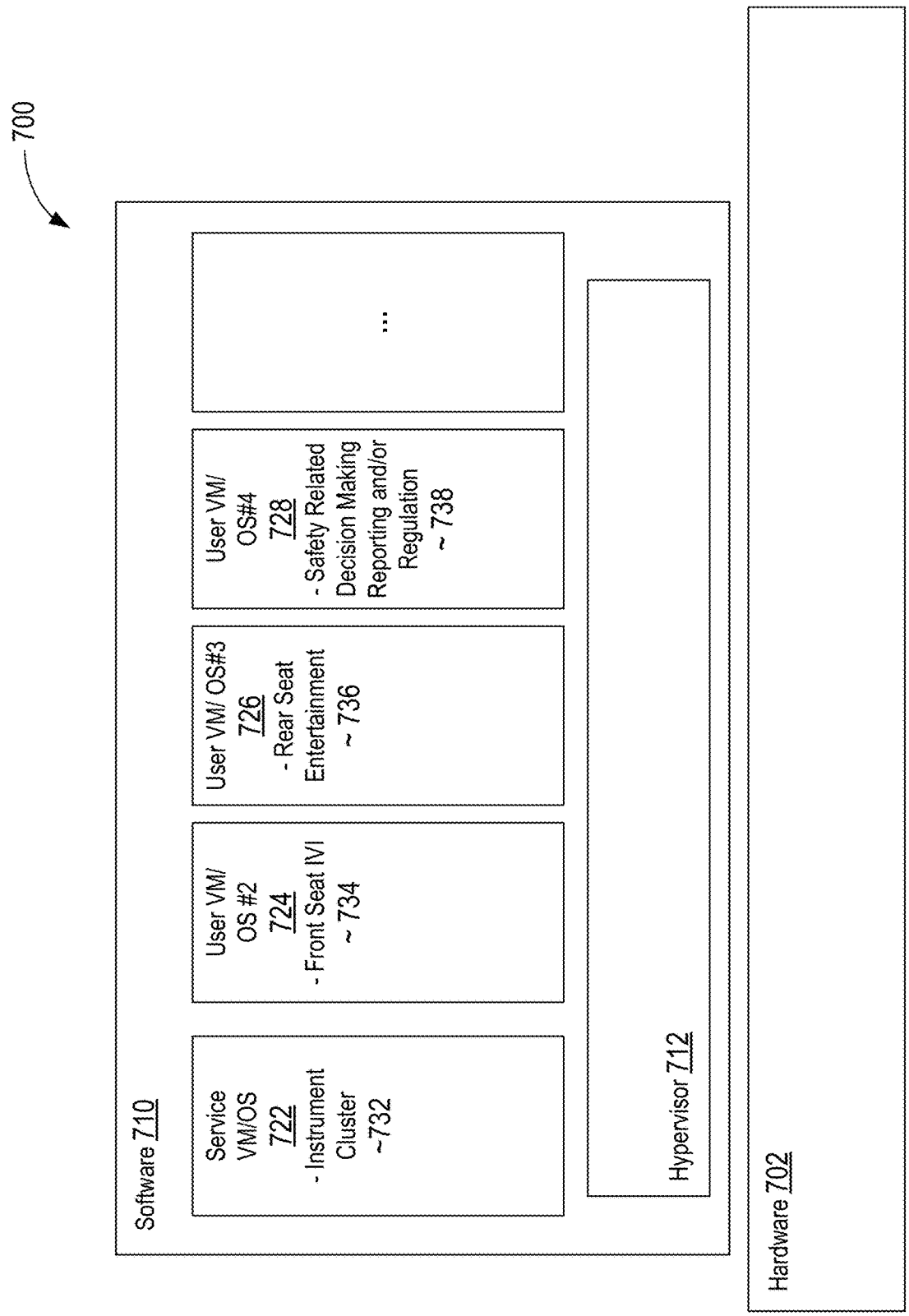
FIG. 7 illustrates a software component view of a safety-related reporting and regulation system, according to various embodiments.

Referring now to FIG. 7, wherein a software component view of a safety-related decision making reporting and/or regulation system ("reporting and/or regulation system") according to various embodiments is illustrated. As shown, for the embodiments, reporting and regulation system 700 includes hardware 702 and software 710. Software 710 includes hypervisor 712 hosting a number of virtual machines (VMs) 722-728. Hypervisor 712 is configured to host execution of VMs 722-728. The VMs 722-728 include a service VM 722 and a number of user VMs 724-728. Service VM 722 includes a service OS hosting execution of a number of instrument cluster applications 732. User VMs 724-728 may include a first user VM 724 having a first user OS hosting execution of front-seat infotainment applications 734, a second user VM 726 having a second user OS hosting execution of rear-seat infotainment applications 736, a third user VM 728 having a third user OS hosting execution of a safety-related decision making applications 738, and so forth.

Except for the technology of the reporting and regulation system of the present disclosure incorporated, e.g., safety-related decision making reporting unit (e.g., reporting unit 150 and associated components and as described in connection with FIG. 5), one or more processing units and associated components of the remote server associated with regulating safety-related decision making rules (e.g., as described in connection with process 300 of FIG. 3) and one or more processing units and associated components of a reporting server (e.g., reporting server associated with a manufacturer as described in connection with process 400 of FIG. 4), elements 712-738 of software 710 may be any one of a number of these elements known in the art. For example, hypervisor 712 may be any one of a number of hypervisors known in the art, such as a kernel-based virtual machine (KVM), an open source hypervisor, Xen, available from Citrix Inc., of Fort Lauderdale, Fla., or VMware, available from VMware Inc. of Palo Alto, Calif., and so forth. Similarly, service OS of service VM 722 and user OS of user VMs 724-728 may be any one of a number of OS known in the art, such as Linux, available, e.g., from Red Hat Enterprise of Raleigh, N.C., or Android, available from Google of Mountain View, Calif.

Figure 8:
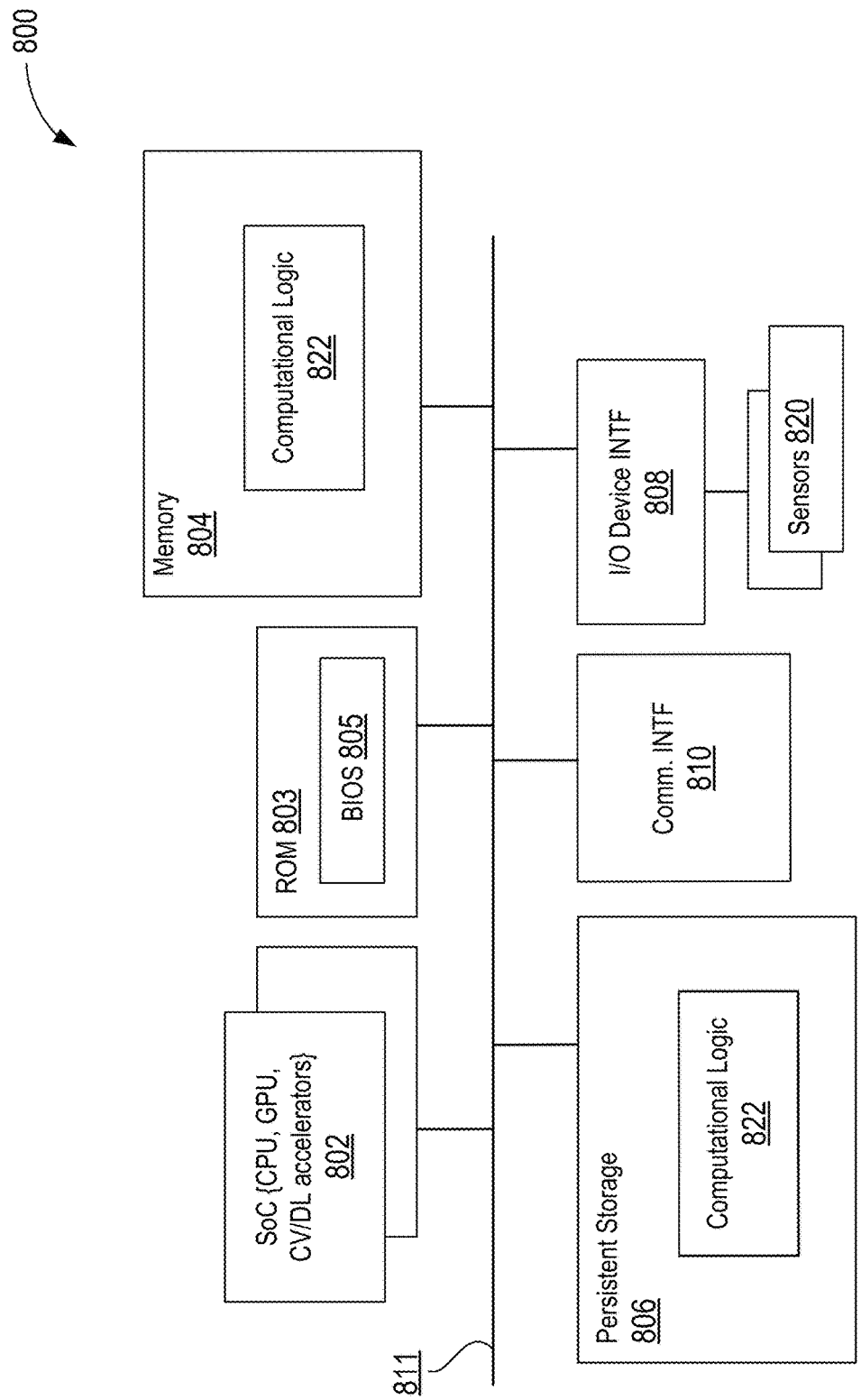
FIG. 8 illustrates a hardware component view of a safety-related reporting and regulation system, according to various embodiments.

Referring now to FIG. 8, wherein an example computing platform that may be suitable for use to practice the present disclosure, according to various embodiments, is illustrated. As shown, computing platform 800, which may be hardware 702 of FIG. 7, may include one or more system-on-chips (SoCs) 802, ROM 803 and system memory 804. Each SoC 802 may include one or more processor cores (CPUs), one or more graphics processor units (GPUs), one or more accelerators, such as computer vision (CV) and/or deep learning (DL) accelerators. ROM 803 may include basic input/output system services (BIOS) 805. CPUs, GPUs, and CV/DL accelerators may be any one of a number of these elements known in the art. Similarly, ROM 803 and BIOS 805 may be any one of a number of ROM and BIOS known in the art, and system memory 804 may be any one of a number of volatile storage known in the art.

Additionally, computing platform 800 may include persistent storage devices 806. Example of persistent storage devices 806 may include, but are not limited to, flash drives, hard drives, compact disc read-only memory (CD-ROM) and so forth. Further, computing platform 800 may include input/output (I/O) device interfaces 808 for interfacing with I/O devices (such as display, keyboard, cursor control, sensors 820 and so forth). At least some of sensors 820 may be sensors 110 of FIG. 1. Still further, computing platform 800 may include communication interfaces 810 (such as network interface cards, modems and so forth). Communication and I/O devices 808 may include any number of communication and I/O devices known in the art. Examples of communication devices may include, but are not limited to, networking interfaces for Bluetooth®, Near Field Communication (NFC), WiFi, cellular communication such as Long Term Evolution (LTE 4G/5G) and so forth. The elements may be coupled to each other via system bus 811 which may represent one or more buses. In the case of multiple buses, they may be bridged by one or more bus bridges (not shown).

Each of these elements may perform its conventional functions known in the art. In particular, ROM 803 may include BIOS 805 having a boot loader. System memory 804 and mass storage devices 806 may be employed to store a working copy and a permanent copy of the programming instructions implementing the operations associated with hypervisor 712, service/user OS of service/user VM 722-728, and components of safety-related decision making reporting unit (e.g., reporting unit 150 including analysis component 152 as related to process 500 of FIG. 5), one or more processing units and associated components of a remote server associated with regulating safety-related decision making rules (e.g., as associated with process 300 of FIG. 3) and one or more processing units and associated components of a reporting server (e.g., associated with process 400 of FIG. 4), collectively referred to as computational logic 822. The various elements may be implemented by assembler instructions supported by processor core(s) of SoCs 802 or high-level languages, such as, for example, C, that can be compiled into such instructions.

Figure 9:
FIG. 9 illustrates a storage medium having instructions for practicing methods described with references to FIGS. 3-7, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 9 illustrates an example 900 of a computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., computing platform 800, in response to execution of the programming instructions, to implement (aspects of) hypervisor 712, service/user OS of service/user VM 722-728, and components of the safety-related decision making reporting and regulation system (such safety-related decision making reporting unit (e.g., reporting unit 150 of FIG. 1), and the processes as described in connection with FIGS. 2-5. In alternate embodiments, programming instructions 904 may be disposed on multiple computer-readable non-transitory storage media 902 instead. In still other embodiments, programming instructions 904 may be disposed on computer-readable transitory storage media 902, such as signals.

Any combination of one or more computer-usable or computer-readable medium(s) may be utilized. The computer-usable or computer-readable medium may be, for example, but not limited to an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operation, elements, components, and/or groups thereof.

Embodiments may be implemented as a computer process, a computing system or an article of manufacture such as a computer program product of computer-readable media. The computer program product may be a computer storage medium readable by a computer system and encoding computer program instructions for executing a computer process.

The corresponding structures, material, acts, and equivalents of all means or steps plus function elements in the claims below are intended to include any structure, material or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but not limited to:

Example 1 is an apparatus for computer-assisted or autonomous driving (CA/AD), comprising: a safety-related decision making reporting unit, disposed in a CA/AD vehicle, to collect data about driving behavior of the CA/AD vehicle and to determine whether the collected data is related to a safety-related decision making rule and whether the collected data is to be reported to a remote organization associated with regulating the safety-related decision making rule; and a communication interface coupled to the safety-related decision making reporting unit to communicate the collected data to the remote organization, in response to a determination that the collected data is to be reported to the remote organization associated with regulating the safety-related decision making rule.

Example 2 is the apparatus of Example 1, wherein to determine whether the collected data is related to a safety-related decision making rule includes to determine whether the collected data relates to an accident or a near accident involving pedestrians or other vehicles proximate to the CA/AD vehicle.

Example 3 is the apparatus of Example 1, further comprising a sensor interface coupled to the safety-related decision making reporting unit to receive sensor data related to the driving behavior of the CA/AD vehicle, and to provide the sensor data to the safety-related decision making reporting unit.

Example 4 is the apparatus of Example 3, further comprising at least one of a vision-based camera, radar, light detection and ranging (LiDAR) sensor, microphone, accelerometer, gyroscope, inertia measurement units (IMU), engine sensor, drive train sensor, and/or tire pressure sensor, coupled to the sensor interface, to assist in collecting the sensor data provided to the safety-related decision making reporting unit.

Example 5 is the apparatus of Example 1, wherein the communication interface is further to receive criteria from the remote organization and provide the received criteria to the safety-related decision making reporting unit, wherein the criteria determines whether the data is required to be reported.

Example 6 is the apparatus of Example 5, wherein the safety-related decision making reporting unit includes an analysis component, and the analysis component is to determine whether the collected data about the driving behavior of the CA/AD vehicle meets the criteria.

Example 7 is the apparatus of any one of Examples 1-7, further comprising a navigation control system including a global positioning satellite (GPS) system coupled to the safety-related decision making reporting unit to provide data about driving behavior of the CA/AD vehicle to the safety-related decision making reporting unit.

Example 8 is a method for vehicle safety-related decision making reporting, comprising: receiving, by a computer-assisted or autonomous driving (CA/AD) system of a CA/AD vehicle, sensor data about driving behavior of the CA/AD vehicle; determining, by the CA/AD system, whether the sensor data is related to a safety-related decision rule; and communicating, by the CA/AD system, the sensor data to a remote organization governing the safety-related decision rule, in response to a determination that the sensor data is related to the safety-related decision rule.

Example 9 is the method of Example 8, wherein determining, by the CA/AD system, whether the sensor data is related to the safety-related decision rule includes determining whether the sensor data is related to an accident or near-accident involving the CA/AD vehicle, a pedestrian, and/or another CA/AD vehicle.

Example 10 is the method of Example 8, wherein determining, by the CA/AD system, whether the sensor data is related to a safety-related decision rule includes determining whether information included in the sensor data meets criteria set by the remote organization.

Example 11 is the method of any one of Examples 8-10, wherein communicating the sensor data to the remote organization governing the safety-related decision rule comprises communicating the sensor data directly to the remote organization according to an indication that an owner of the CA/AD vehicle gives permission for the sensor data to be communicated to the remote organization.

Example 12 includes an apparatus comprising means for performing the method of any one of Examples 8-11, or some other example herein.

Example 13 is one or more computer-readable media (CRM) containing instructions written thereon to cause a reporting server associated with a manufacturer of computer-assisted or autonomous driving (CA/AD) vehicles, in response to execution of the instructions, to: receive data from respective CA/AD systems of CA/AD vehicles manufactured by the manufacturer, wherein the data includes driving behavior data of the CA/AD vehicles that are related to a safety-related decision rule; process the received data to generate composite driving behavior data of the CA/AD vehicles of the manufacturer for the safety-related decision rule; and provide the composite driving behavior data of the CA/AD vehicles of the manufacturer for the safety-related decision rule to a remote organization that regulates the safety-related decision rule.

Example 14 is the one or more computer-readable media (CRM) of Example 13, wherein the reporting server is further caused to receive from the remote organization, the safety-related decision rule to be implemented by CA/AD vehicles.

Example 15 is the one or more computer-readable media (CRM) of Example 14, wherein the reporting server is further caused to receive from the remote organization, criteria for deciding what type of driving behavior data is related to the safety-related decision rule for the CA/AD vehicles, and in response to the receipt of the criteria, provide the criteria to the CA/AD systems of the CA/AD vehicles of the manufacturer.

Example 16 is the one or more computer-readable media (CRM) of Example 13, wherein the reporting server is a third party reporting server that services a plurality of manufacturers of CA/AD vehicles.

Example 17 is the one or more computer-readable media (CRM) of any one of Examples 13-16, wherein the composite driving behavior data of the CA/AD vehicles of the manufacturer for the safety-related decision rule provided to the remote organization is required by law to be provided to the remote organization.

Example 18 is one or more computer-readable media (CRM) containing instructions written thereon to cause a server associated with regulating safety-related decision making rules for computer-assisted or autonomous driving (CA/AD) vehicles, in response to execution of the instructions, to: receive data from manufacturers of CA/AD vehicles, wherein the received data includes composite driving information related to safety-related decision making behavior of respective CA/AD vehicles of respective manufacturers of the manufacturers of CA/AD vehicles; analyze the received data to modify or generate one or more safety-related decision making rules for the respective CA/AD vehicles; and provide the modified or generated one or more safety-related decision making rules to the respective manufacturers of the respective CA/AD vehicles.

Example 19 is the one or more CRM of Example 18 wherein the composite driving information includes data received by the respective manufacturers from CA/AD systems of the respective CA/AD vehicles manufactured by the manufacturer.

Example 20 is the one of more CRM of Example 18, wherein the modified or generated one or more safety-related decision making rules is to be implemented by the respective manufacturers in the respective CA/AD vehicles.

Example 21 is the one or more CRM of Example 20, wherein the safety-related decision making rules to be implemented in the respective CA/AD vehicles are required by law to be implemented in the respective CA/AD vehicles.

Example 22 is the one of more CRM of Example 18, wherein the server is further caused to analyze the received data to determine a cause of an accident or a near accident involving one or more of the respective CA/AD vehicles and to base the modification or generation of the additional one or more safety-related decision rules on ethical rules related to an outcome of the accident or the near accident.

Example 23 is the one of more CRM of Example 21, wherein the server is further caused to analyze the received data to determine whether the outcome of the accident or near accident is related to a safety-related decision rule implemented in one or more of the CA/AD vehicles.

Example 24 is the one of more CRM of Example 22, wherein the server is further caused to access a database including information related to scenarios associated with similar accidents or near accidents to assist in the modification or generation of the additional one or more safety-related decision rules.

Example 25 is the one of more CRM of Example 18, wherein the server is further caused to provide the respective manufacturers of CA/AD vehicles criteria for deciding what type of driving behavior data is related to the safety-related decision making behavior.

Example 26 is the one of more CRM of any one of Examples 17-25, wherein the server is further caused to provide information related to a smart regulation contract to the respective manufacturers of the respective CA/AD vehicles.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computer-assisted or autonomous driving (CA/AD), comprising:
  a safety-related decision making reporting unit, disposed in a CA/AD vehicle, to collect data about driving behavior of the CA/AD vehicle and to determine whether the collected data is related to a safety-related decision making rule and whether the collected data is to be reported to a remote organization associated with regulating the safety-related decision making rule; and a communication interface coupled to the safety-related decision making reporting unit to communicate the collected data to the remote organization, in response to a determination that the collected data is to be reported to the remote organization associated with regulating the safety-related decision making rule, wherein the collected data is used to determine whether the safety-related decision making rule is to be modified and if the safety-related decision making rule is to be modified, the modified safety-related decision making rule is to be included in a plurality of safety-related decision making rules received by the CA/AD vehicle from the remote organization or a manufacturer of the CA/AD vehicle.

2. The apparatus of claim 1, wherein to determine whether the collected data is related to the safety-related decision making rule includes to determine whether the collected data relates to an accident or a near accident involving pedestrians or other vehicles proximate to the CA/AD vehicle.

3. The apparatus of claim 1, further comprising a sensor interface coupled to the safety-related decision making reporting unit to receive sensor data related to the driving behavior of the CA/AD vehicle, and to provide the sensor data to the safety-related decision making reporting unit.

4. The apparatus of claim 3, further comprising at least one of a vision-based camera, radar, light detection and ranging (LiDAR) sensor, microphone, accelerometer, gyroscope, inertia measurement units (IMU), engine sensor, drive train sensor, and/or tire pressure sensor, coupled to the sensor interface, to assist in collecting the sensor data provided to the safety-related decision making reporting unit.

5. The apparatus of claim 1, wherein the communication interface is further to receive criteria from the remote organization and provide the received criteria to the safety-related decision making reporting unit, wherein the criteria determines whether the data is required to be reported.

6. The apparatus of claim 5, wherein the safety-related decision making reporting unit includes an analysis component, and the analysis component is to determine whether the collected data about the driving behavior of the CA/AD vehicle meets the criteria.

7. The apparatus of claim 1, further comprising a navigation control system including a global positioning satellite (GPS) system coupled to the safety-related decision making reporting unit to provide data about driving behavior of the CA/AD vehicle to the safety-related decision making reporting unit.

8. A method for vehicle safety-related decision making reporting, comprising:
 receiving, by a computer-assisted or autonomous driving (CA/AD) system of a CA/AD vehicle, sensor data about driving behavior of the CA/AD vehicle;
 determining, by the CA/AD system, whether the sensor data is related to a safety-related decision rule; and
 communicating, by the CA/AD system, the sensor data to a remote organization governing the safety-related decision rule, in response to a determination that the sensor data is related to the safety-related decision rule, wherein the sensor data is used to determine whether the safety-related decision making rule is to be modified and if the safety-related decision making rule is to be modified, the modified safety-related decision making rule is to be included in a plurality of safety-related decision making rules received by the CA/AD vehicle from the remote organization or a manufacturer of the CA/AD vehicle.

9. The method of claim 8, wherein determining, by the CA/AD system, whether the sensor data is related to the safety-related decision rule includes determining whether the sensor data is related to an accident or near accident involving the CA/AD vehicle, a pedestrian, and/or another CA/AD vehicle.

10. The method of claim 8, wherein determining, by the CA/AD system, whether the sensor data is related to the safety-related decision rule includes determining whether information included in the sensor data meets criteria set by the remote organization.

11. The method of claim 8, wherein communicating the sensor data to the remote organization governing the safety-related decision rule comprises communicating the sensor data directly to the remote organization according to an indication that an owner of the CA/AD vehicle gives permission for the sensor data to be communicated to the remote organization.

12. One or more computer-readable media (CRM) containing instructions written thereon to cause a reporting server associated with a manufacturer of computer-assisted or autonomous driving (CA/AD) vehicles, in response to execution of the instructions, to:
 receive data from respective CA/AD systems of CA/AD vehicles manufactured by the manufacturer, wherein the data includes driving behavior data of the CA/AD vehicles that are related to a safety-related decision rule;
 process the received data to generate composite driving behavior data of the CA/AD vehicles of the manufacturer for the safety-related decision rule; and
 provide the composite driving behavior data of the CA/AD vehicles of the manufacturer for the safety-related decision rule to a remote organization that regulates the safety-related decision rule, wherein the composite driving behavior data is used to determine whether the safety-related decision making rule is to be modified and if the safety-related decision making rule is modified, the modified safety-related decision making rule is to be included in a plurality of safety-related decision making rules provided from the remote organization or the manufacturer to the CA/AD vehicle.

13. The one or more computer-readable media (CRM) of claim 12, wherein the reporting server is further caused to receive, from the remote organization, the safety-related decision rule to be implemented by the CA/AD vehicles.

14. The one or more computer-readable media (CRM) of claim 13, wherein the reporting server is further caused to receive, from the remote organization, criteria for deciding what type of driving behavior data is related to the safety-related decision rule for the CA/AD vehicles, and in response to the receipt of the criteria, provide the criteria to the CA/AD systems of the CA/AD vehicles of the manufacturer.

15. The one or more computer-readable media (CRM) of claim 12, wherein the reporting server is a third party reporting server that services a plurality of manufacturers of CA/AD vehicles.

16. The one or more computer-readable media (CRM) of claim 12, wherein the composite driving behavior data of the CA/AD vehicles of the manufacturer for the safety-related decision rule provided to the remote organization is required by law to be provided to the remote organization.

17. One or more computer-readable media (CRM) containing instructions written thereon to cause a server associated with regulating safety-related decision making rules for computer-assisted or autonomous driving (CA/AD) vehicles, in response to execution of the instructions, to:

receive data from manufacturers of CA/AD vehicles, wherein the received data includes composite driving information related to safety-related decision making behavior of respective CA/AD vehicles of respective manufacturers of the manufacturers of CA/AD vehicles;

analyze the received data to modify or generate one or more safety-related decision making rules for the respective CA/AD vehicles; and provide the modified or generated one or more safety-related decision making rules in a plurality of safety-related decision making rules provided to the CA/AD vehicles or to respective manufacturers of the respective CA/AD vehicles.

18. The one or more CRM of claim 17, wherein the composite driving information is received by the respective manufacturers from CA/AD systems of the respective CA/AD vehicles manufactured by the manufacturer.

19. The one of more CRM of claim 17, wherein the modified or generated one or more safety-related decision making rules is to be implemented by the respective manufacturers in the respective CA/AD vehicles.

20. The one or more CRM of claim 19, wherein the safety-related decision making rules to be implemented in the respective CA/AD vehicles are required by law to be implemented in the respective CA/AD vehicles.

21. The one of more CRM of claim 17, wherein the server is further caused to analyze the received data to determine a cause of an accident or a near accident involving one or more of the respective CA/AD vehicles and to base the modification or generation of additional one or more safety-related decision rules on ethical rules related to an outcome of the accident or the near accident.

22. The one of more CRM of claim 21, wherein the server is further caused to analyze the received data to determine whether the outcome of the accident or near accident is related to a safety-related decision rule implemented in one or more of the CA/AD vehicles.

23. The one of more CRM of claim 22, wherein the server is further caused to access a database including information related to scenarios associated with similar accidents or near accidents to assist in the modification or generation of the additional one or more safety-related decision rules.

24. The one of more CRM of claim 17, wherein the server is further to provide information related to a smart regulation contract to the respective manufacturers of the respective CA/AD vehicles.

\* \* \* \* \*